Feb. 28, 1939.  C. F. OSGOOD  2,148,495
APPARATUS FOR MINING
Filed Nov. 15, 1935   7 Sheets-Sheet 1

INVENTOR:
CHARLES F. OSGOOD.
BY Louis A. Mason
ATT'Y.

Feb. 28, 1939.  C. F. OSGOOD  2,148,495
APPARATUS FOR MINING
Filed Nov. 15, 1935  7 Sheets-Sheet 3

INVENTOR:
CHARLES F. OSGOOD.
BY Louis A. Maxson,
ATT'Y.

Feb. 28, 1939. C. F. OSGOOD 2,148,495
APPARATUS FOR MINING
Filed Nov. 15, 1935  7 Sheets-Sheet 7

INVENTOR:
CHARLES F. OSGOOD.
BY Louis A. Mason
ATT'Y.

Patented Feb. 28, 1939

2,148,495

UNITED STATES PATENT OFFICE 2,148,495

APPARATUS FOR MINING

Charles F. Osgood, Claremont, N. H., assignor to Sullivan Machinery Company, a corporation of Massachusetts Application November 15, 1935, Serial No. 50,029

4 Claims. (Cl. 262—28)

This invention relates to improved apparatus for mining, and more particularly to an improved coal mining apparatus for cutting and dislodging the coal in a coal seam.

An object of this invention is to provide improved apparatus for the mining of coal whereby the coal is cut and dislodged from a coal seam in an improved manner. Another object is to provide an improved coal mining apparatus for cutting kerfs in a coal seam and thereafter applying a powerful breaking down pressure to the coal previously cut to break down the coal from the coal seam. A further object is to provide an improved coal mining apparatus having kerf cutting means for cutting kerfs in the coal seam and having associated with the kerf cutting means improved means for applying a powerful breaking-down force to the coal previously cut by the cutting means. A still further object is to provide improved coal breaking means embodied in the kerf cutter of the kerf cutting means whereby, when the kerf cutter is inserted in the coal, a powerful coal breaking pressure may be applied to the coal to dislodge the latter. Yet another object is to provide an improved kerf cutter having embodied therein expansible means extending substantially along the length of the cutting portion of the kerf cutter for applying a powerful coal-breaking-down pressure to the coal in planes perpendicular to the plane of the kerf to dislodge the coal. A further object is to provide in a coal breaking kerf cutter of the above character improved hydraulically operated expansible means for breaking down the coal. Other objects and advantages of the invention will, however, hereinafter more fully appear.

In the accompanying drawings there are shown for purposes of illustration one form and several modifications thereof which the invention may assume in practice.

In these drawings—

Figure 1:
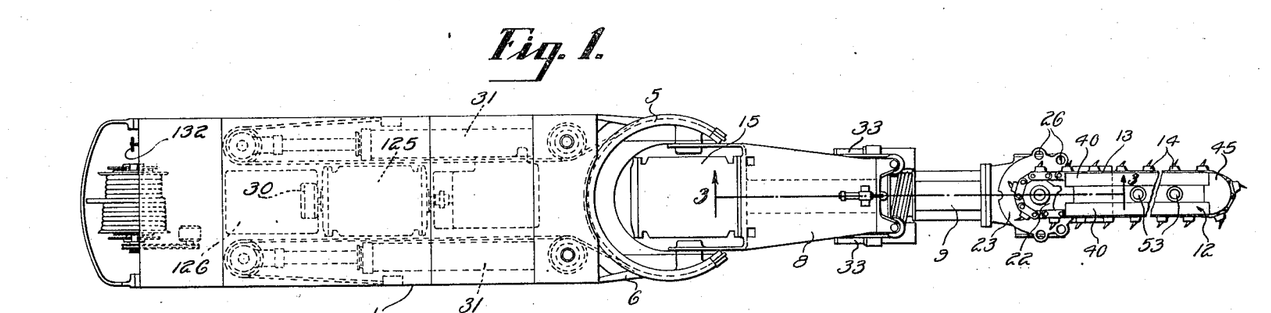
Fig. 1 is a plan view of a coal mining apparatus having embodied therein one illustrative form of the improved coal dislodging means.
Figure 2:
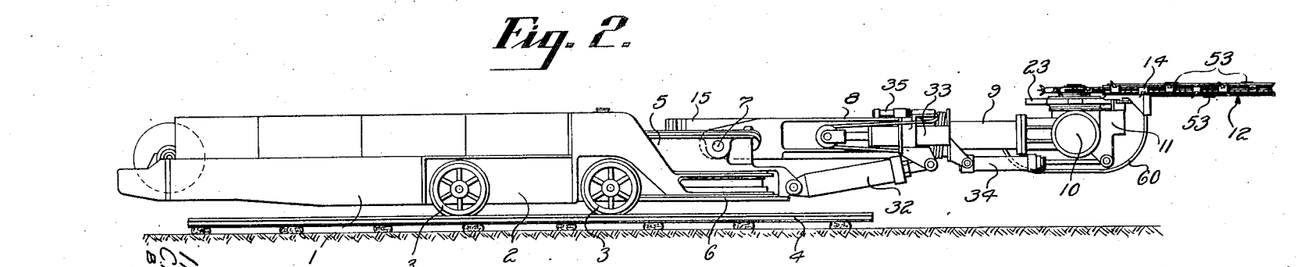
Fig. 2 is a side elevational view of the mining apparatus shown in Fig. 1.
Figure 3:
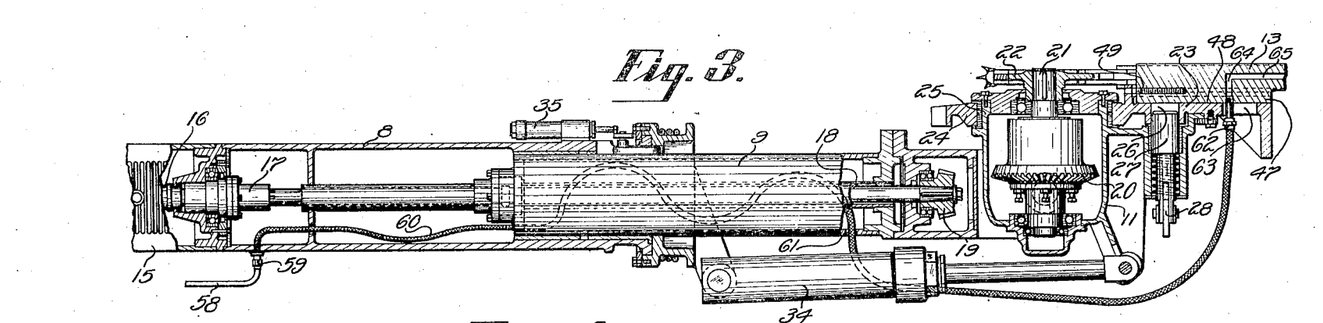
Fig. 3 is an enlarged view in longitudinal section taken substantially on line 3—3 of Fig. 1.
Figure 4:
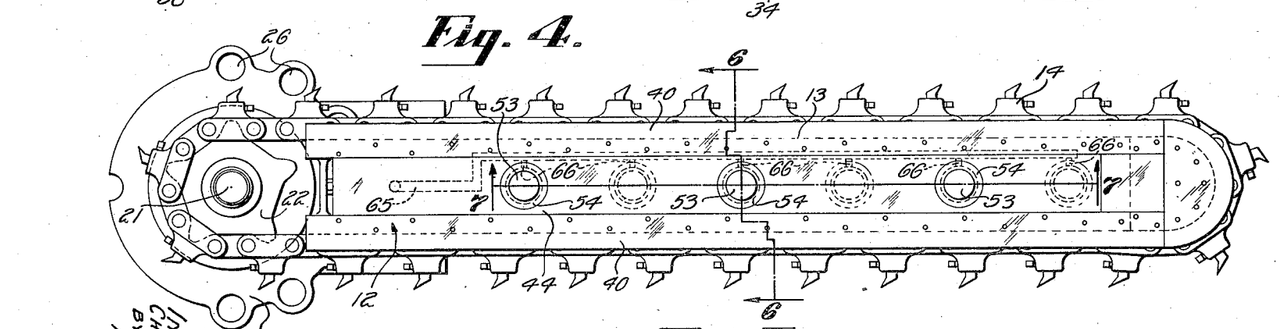
Fig. 4 is an enlarged plan view of the improved cutter bar shown in Fig. 1.
Figure 5:
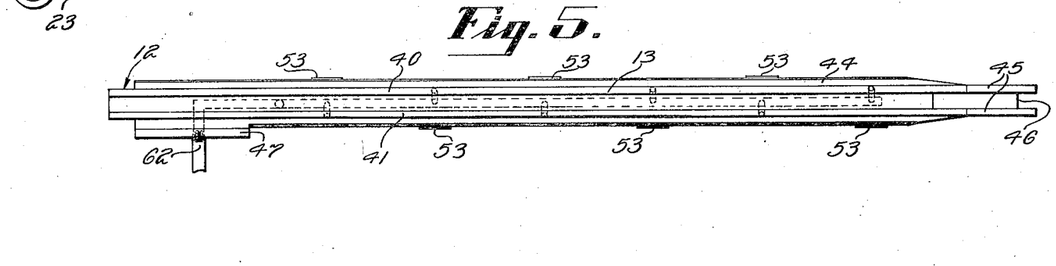
Fig. 5 is a side elevational view of the cutter bar shown in Fig. 4.
Figure 6:
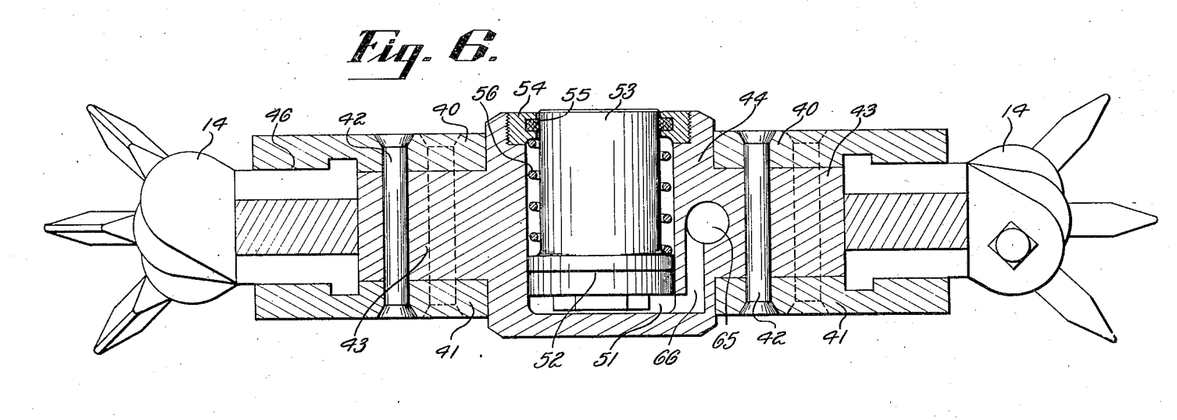
Fig. 6 is an enlarged cross sectional view taken on line 6—6 of Fig. 4.

In this illustrative construction the several forms of the improved coal breaking cutter bar are shown embodied in a coal mining apparatus of the universal cutter type, herein of the same general character as that disclosed in a copending application of one Joseph F. Joy, Ser. No. 20,826, filed May 10, 1935, although it will be evident that the improved coal breaking means may be embodied in mining apparatus of various other types. The coal mining apparatus disclosed herein comprises a portable base 1 in the form of a truck frame 2 mounted on wheels 3 adapted to run along a mine trackway 4 laid on the mine floor. As described in the above mentioned Joy application, the truck frame 2 has mounted thereon at its forward end a horizontal turntable 5 journaled for rotation about a vertical axis with respect to the truck frame on a forwardly projecting horizontal frame portion 6 projecting in advance of the front truck wheels, the turntable axis being located on the truck frame in advance of the front truck wheels. Pivotally mounted at 7 on the horizontal turntable 5 for vertical swinging movement with respect thereto is an elongated arm structure 8 having mounted thereon at its forward extremity for rotation about an axis extending longitudinally of the arm structure a revolving head 9 in turn having pivotally mounted thereon to swing relative thereto about an axis 10 at right angles to the head axis a cutter support 11 carrying a kerf cutter 12. The kerf cutter is in the form of an elongated plane cutter bar 13 of a conventional form having mounted for circulation orbitally about its margin an endless cutter-bit-carrying cutter chain 14. Supported on the rearward portion of the swingable arm structure 8 is a motor 15 having its power shaft 16 extending longitudinally of the arm structure and connected through a coupling 17 to a longitudinal shaft 18 suitably journaled within the arm structure, with its axis in coincidence with the revolving head axis. Keyed to the forward end of the shaft 18 is a bevel gear 19 which drives, through bevel gearing in a manner clearly described in the above mentioned copending application, a bevel gear 20 connected to a shaft 21. The shaft 21 is suitably journaled in the tiltable cutter support 11 and has keyed thereto a chain sprocket 22 which engages and drives the endless cutter chain 14. The cutter bar 13 is mounted on a hanger 23 having an annular bearing portion 24 journaled on bearing sleeves supported by a cylindric bearing support 25 formed integral with the tiltable cutter support 11 so that the cutter bar may be swung relative to the support 11 about the axis of the shaft 21. The hanger frame is provided with a plurality of apertures 26 within which a slidable locking pin 27 is adapted to project to lock the bar hanger to the cutter support, the locking pin being guided on the cutter support and having suitable manual release means 28. Supported within the truck frame is a motor driven pump 30 for supplying hydraulic pressure to hydraulic cylinders 31, 31 for rotating the turntable 5, hydraulic cylinders 32 for vertically swinging the arm structure 8, hydraulic cylinders 33 for revolving the head 9, a hydraulic cylinder 34 for swinging the cutter support 11, a hydraulic lock 35 for the revolving head 9 and the hydraulic operating means for the truck drive control clutches and the truck wheel brake. Also mounted within the truck frame is motor driven means for driving the truck wheels to propel the apparatus along the mine trackway both during transport and the cutting operation. As the various hydraulic adjusting devices, the lock and clutch, the brake operating means and the truck wheel driving mechanism are clearly described in the copending application above referred to and do not per se enter into this invention, further detailed description of the specific structure and mode of operation thereof are herein considered unnecessary other than to state that the cutter bar 13 may be adjusted to cut kerfs at any desired location in the coal face and in either rib.

Figure 7:
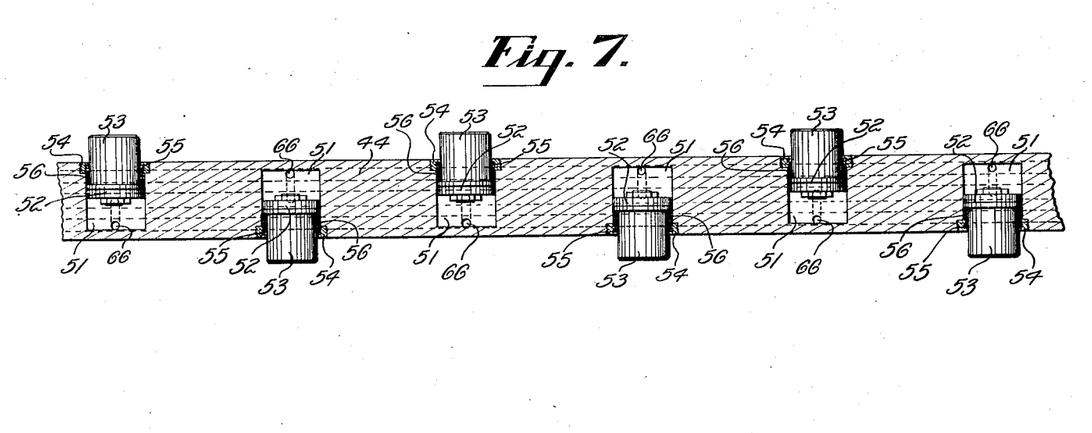
Fig. 7 is an enlarged view in longitudinal section taken on line 7—7 of Fig. 4, showing the plungers extended.

Now referring to the improved coal breaking means embodied in the kerf cutter 12 and the particular cutter bar structure, it will be noted that the cutter bar 13 comprises parallel top plates 40 and parallel bottom plates 41, the plates 40 and 41 being secured as by rivets 42 to bar-like projections 43 formed integral with a longitudinally extending cylinder block 44, herein extending lengthwise of the cutter bar throughout a substantial portion of its length. The tip end of the cutter bar is provided with curved top and bottom plates 45 likewise fixed to the cylinder block 44, and these plates 40, 41 and 45 cooperate with the bar portions 43 of the cylinder block to form a guideway 46 about the margin of the cutter bar within which the endless cutter chain 14 is guided. The cylinder block 44 is also provided with a guide portion 47 mounted in a longitudinal guideway 48 in the hanger 23, and an adjusting screw 49 is arranged between the cutter bar and hanger for adjusting the cutter bar along the hanger guideway so that the cutter chain may be tightened. As clearly shown in Figs. 4 to 7, inclusive, formed in the cylinder block 44 of the cutter bar is a series of cylinders 51 arranged with their axes perpendicular to the plane of the cutter bar and each having reciprocably mounted therein a piston 52. Each of these pistons is provided with a cylindric plunger or ram 53 guided within a detachable head 54 secured within the cylinder, and each cylinder head is provided with packing means 55 sealingly engaging the plunger periphery to prevent oil leakage, while interposed between each head and the piston and encircling the plunger within the cylinder bore is a coil spring 56 constantly urging each plunger toward its innermost retracted position. As shown in Fig. 7, the plungers of alternate pistons are oppositely disposed so that certain of the plungers act in one direction while the others act in the opposite direction. As illustrated, the plunger bores are arranged in the central longitudinal plane of the cutter bar midway between the sides of the bar with their axes perpendicular to the plane of the bar and so that the plungers act in planes perpendicular to the plane of the cutter bar. The pump is connected, in a manner to be later described, through a pipe 58 to a connection 59 on the arm structure and through the connection 59 to a flexible tubing 60 extending through the arm structure along the axis of the revolving head and out through an opening 61 in the side of the revolving head to a connection 62 secured to the cutter bar. The connection 62 extends through a longitudinal slot 63 in the bar hanger so that the cutter bar may be adjusted along its guideway relative to the hanger. The flexible tubing is connected through the connection 62 to a passage 64 formed in the cutter bar in turn communicating with a longitudinal passage 65 formed in the wall of the cylinder block 44. The passage 65 is connected to the ends of the cylinder bores at the inner sides of the pistons 52 through passages 66. It will thus be seen that when hydraulic pressure is supplied through the pipe 58, connection 59, tubing 60, connection 62, passages 64, 65 and 66 to the cylinders, the plungers may be moved outwardly relative to the cutter bar as will later be described.

Figure 8:
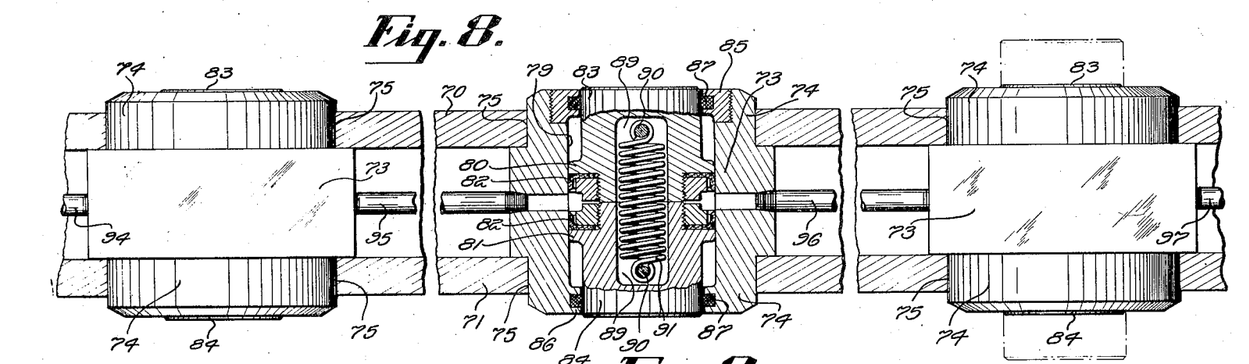
Fig. 8 is an enlarged fragmentary sectional view similar to Fig. 7, showing a modified form of coal breaking means, the view being taken on line 8—8 of Fig. 9.
Figure 9:
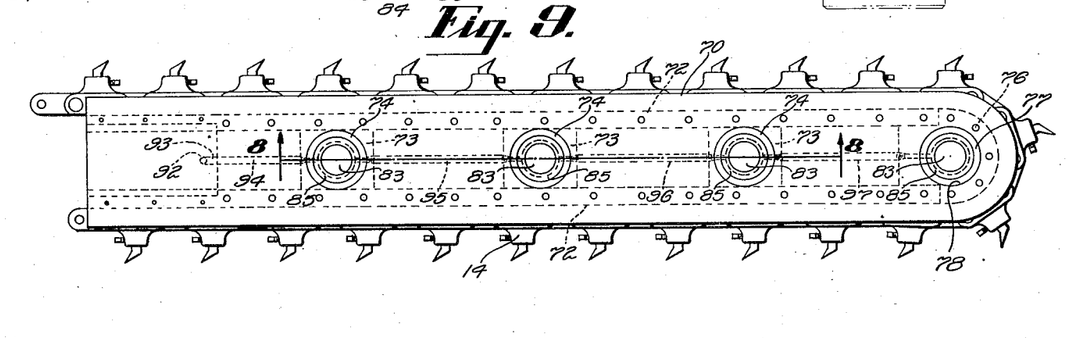
Fig. 9 is a view similar to Fig. 4, showing in plan a cutter bar having embodied therein the modified form of coal breaking means shown in Fig. 8.
Figure 10:
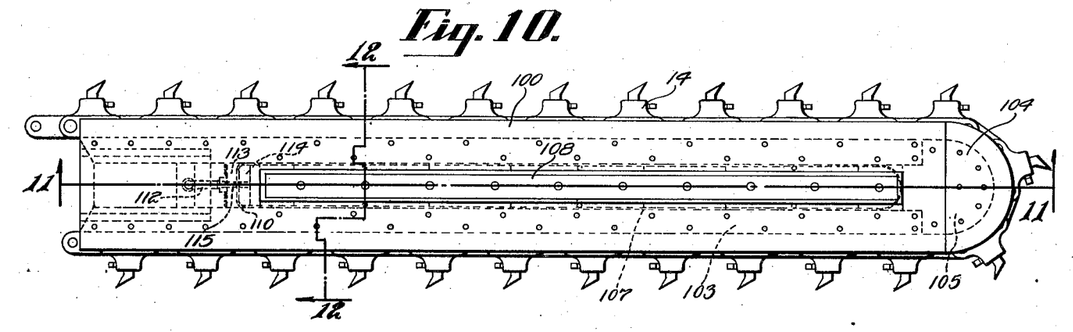
Fig. 10 is a view similar to Fig. 9, showing in plan a cutter bar having embodied therein a further modified form of coal breaking means.
Figure 11:
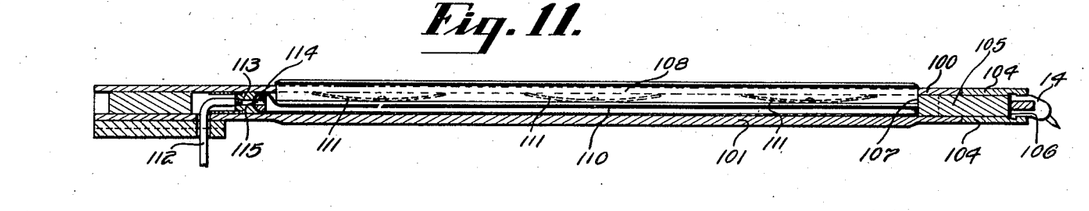
Fig. 11 is a view in longitudinal section taken substantially on line 11—11 of Fig. 10.
Figure 12:
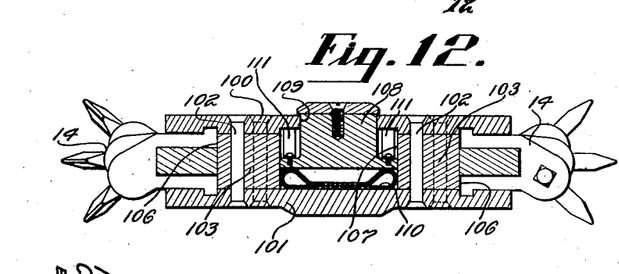
Fig. 12 is a cross sectional view taken on line 12—12 of Fig. 10.
Figure 13:
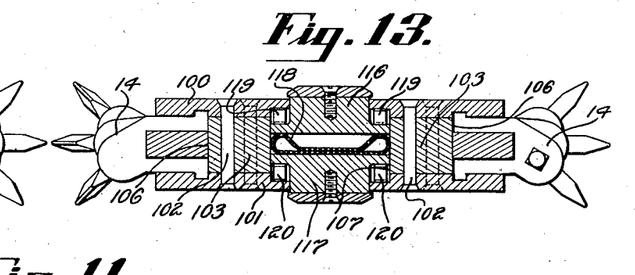
Fig. 13 is a view similar to Fig. 12 showing a still further modified form of construction.

In the modified form of coal breaking kerf cutter shown in Figs. 8 and 9, the cutter bar comprises parallel top and bottom plates 70 and 71 secured, as by riveting, to parallel longitudinally extending side bars 72, the plates cooperating with the side bars to form the guideway about the margin of the cutter bar within which the cutter chain is circulated. Arranged in the space between the side bars and top and bottom plates is a plurality of cylinder blocks 73 of rectangular form, each having oppositely disposed cylindrical portions 74 projecting through openings 75 formed in the top and bottom plates 70 and 71 respectively. Arranged between the top and bottom plates of the cutter bar and secured to the side bars 72 is an end cylinder block 76 likewise having oppositely projecting cylindrical portions 77 extending through bores 78 formed in the top and bottom plates. These cylinder blocks each have formed therein a cylinder bore 79 containing coaxial, oppositely acting reciprocable pistons 80 and 81. These pistons are provided with suitable packing 82 and have oppositely extending plungers or rams 83 and 84 acting in planes perpendicular to the plane of the cutter bar substantially along the length of the cutting portion of the cutter bar, the plungers 83 extending through the detachable heads 85 of the cylinders, while the plungers 84 extend through the integral lower cylinder heads 86. These cylinder heads each carry packing 87 sealingly engaging the plunger peripheries to prevent oil leakage. As shown in Fig. 8, the plungers are made hollow at 89 and connected between pins 90 secured to the plungers 83 and 84 respectively, and arranged in the hollow portion of the plungers is a coil tension spring 91 constantly urging the plungers toward their innermost collapsed position. In this construction, fluid pressure is conducted to the cylinder bores between the pistons through a passage 92 in the cutter bar communicating with a longitudinal passage 93 connected by a pipe 94 to the bore of the innermost cylinder. The bores of the two innermost cylinders are connected together by a pipe 95, while similar pipes 96 and 97 connect the bores of the other cylinder blocks together so that fluid pressure flows from one cylinder to another to act on the pistons therein.

In the modified forms of construction shown in Figs. 10 to 13, inclusive, it will be noted that the cutter bar comprises parallel top and bottom plates 100 and 101 secured as by rivets 102 to intermediate parallel blocks 103. Secured to the intermediate blocks 103 and cooperating with the top and bottom plates at the tip end of the bar are arcuate top and bottom plates 104 and a separate end block 105, the plates 100, 101 and 104 cooperating with the blocks 103 and 105 to form a guideway 106 about the margin of the cutter bar within which the endless cutter chain 14 circulates. The intermediate blocks 103 extend longitudinally in parallelism with the parallel sides of the cutter bar, substantially throughout the length of the cutting portion of the cutter bar, and have formed therebetween an elongated longitudinal chamber 107 in which is guided an elongated, relatively narrow plunger 108, this plunger extending outwardly through an elongated slot 109 formed in the top plate 100. Interposed between the plunger 108 and the bottom plate 101 is an expansible receptacle or breaker pad 110, herein in the form of a re-enforced rubber bag. The plunger 108 is constantly urged towards its innermost retracted position by means of suitable springs 111. Fluid under pressure is adapted to be conducted to the expansible receptacle through a flexible tubing 112 connected to a block 113. Arranged within the receptacle is a block 114 secured to the block 113 so that the wall of the receptacle is tightly clamped between these two blocks. The tubing 112 is connected through a passage 115 formed in the blocks and receptacle communicating with the interior of the receptacle. In the modification shown in Fig. 13 the parallel blocks 103 have reciprocably mounted within the chamber 107 therebetween, oppositely acting plungers 116 and 117 having interposed therebetween an expansible receptacle 118 similar to the expansible receptacle above referred to. Springs 119 and 120 constantly urge the plungers toward their innermost retracted position. Fluid under pressure is supplied to the receptacle 118 in a manner similar to that clearly shown in Fig. 11. It will thus be seen that the plunger 108 shown in Fig. 12 and the oppositely acting plungers 116, 117 shown in Fig. 13 extend longitudinally of the cutter bar within the orbit of the cutter chain and act in planes perpendicular to the plane of the cutter bar along substantially the entire cutting portion of the latter.

Figure 14:
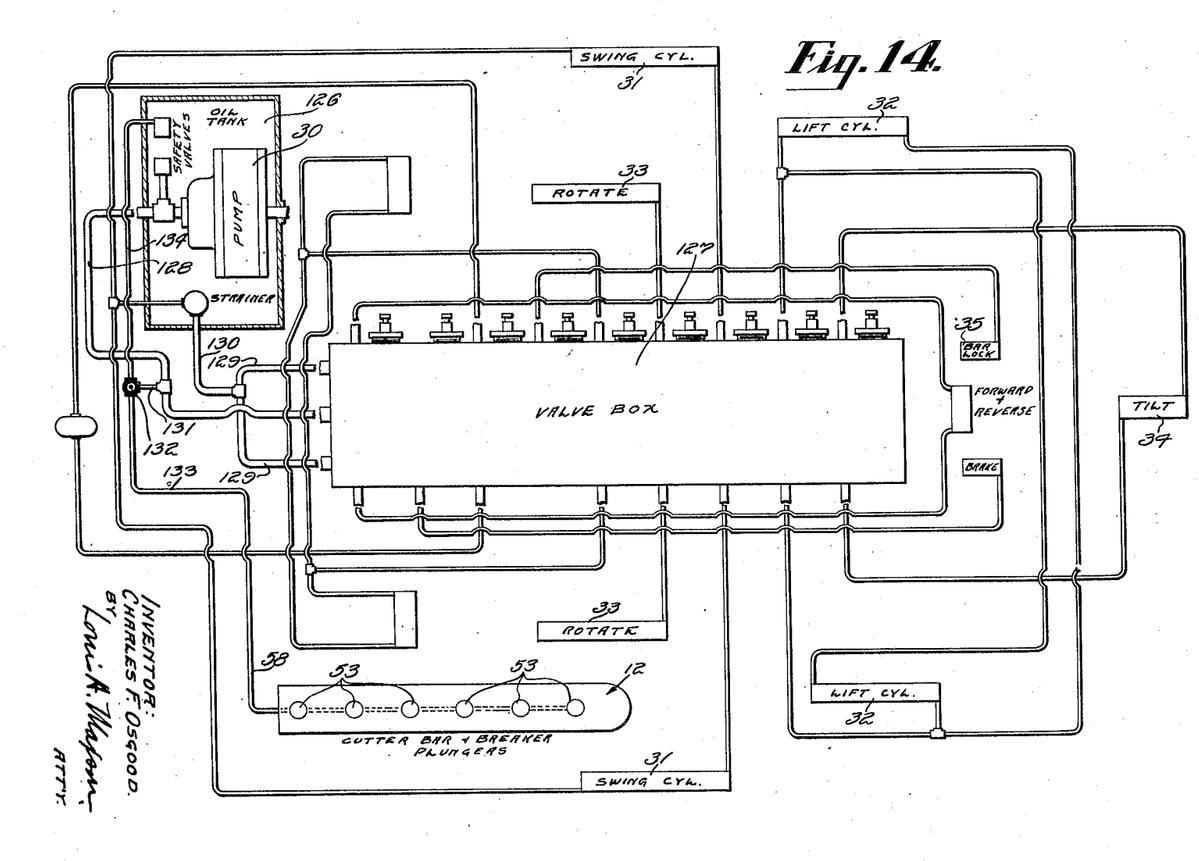
Fig. 14 is a diagrammatic view showing the hydraulic fluid system.
Figure 15:
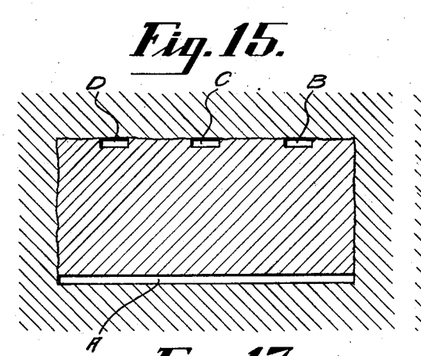
Figs. 15 to 20, inclusive, are diagrammatic views showing various methods of cutting and breaking down the coal in a coal seam.

Now referring to the hydraulic system and associated control means shown in Fig. 14, it will be noted that the pump 30 is driven by a motor 125 (see Fig. 1) which also drives the transmission mechanism for propelling the apparatus in a manner clearly described in the above mentioned Joy application, Serial No. 20,826. This pump 30 is arranged in a tank 126 adapted to contain a liquid, preferably oil, and the pump, submerged in the liquid, is adapted to supply hydraulic pressure to the various hydraulically operated devices of the apparatus. Arranged within the truck frame is a horizontal valve box 127 of a design similar to that described in the above mentioned copending application, and this valve box has formed therein a series of horizontal valve bores each containing a balanced-type slide valve for controlling the flow of hydraulic pressure to the various hydraulic devices. The pump 30 is herein of the variable displacement triple rotor type of a conventional design and is provided with usual variable displacement control valves for regulating the pressure in the fluid system. The discharge side of the pump 30 is connected through a conduit 128 to the supply passage of the valve box 127, while the discharge passages of the valve box are connected through branched conduits 129, 129 to a conduit 130 leading to the tank 126. Conduits connect the various hydraulic cylinders 31, 32, 33, 34 and 35 and the truck drive clutch control means and the truck wheel brake cylinder with the valve box 127, and as previously mentioned this valve box contains slide valves for controlling the flow of hydraulic pressure through these conduits to the various hydraulic devices. As these various conduits and the particular slide valve structure are clearly described in the above mentioned Joy application, further description thereof is herein considered unnecessary other than to state that the turntable 5 may be rotated, the arm structure 8 swung vertically, the revolving head 9 rotated and the cutter support 11 tilted to vary the position of the cutter bar and for swinging the cutter bar during the cutting operation. This valve structure also controls the flow of liquid pressure to the hydraulic cutter head lock 35 and the cylinders of the truck drive control clutches and the truck wheel brake. The supply conduit 128 has a conduit 131 connected thereto, and this conduit 131 is connectible through a manual control valve 132, located at the rear end of the truck frame, to a conduit 133 communicating with the tubing 58 of the expansible coal breaking means. The valve 132 is connected by a conduit 134 back to the tank 126 so that when the valve 132 is in a position to cut off the flow of hydraulic pressure through the conduit 131 to the conduit 133, the latter may be connected back to the tank through the conduit 134.

Figure 16:
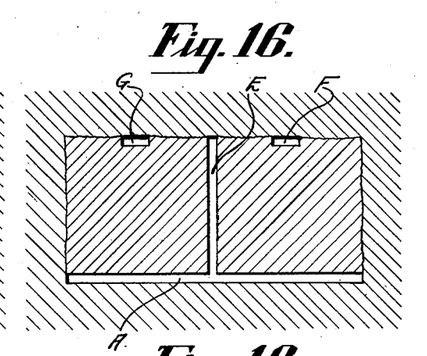
Figure 17:
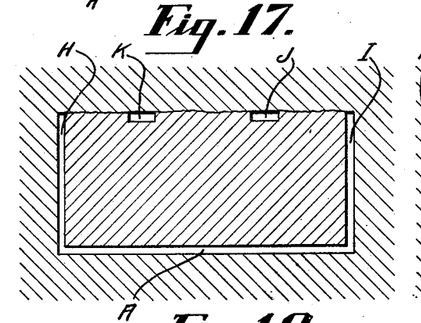
Figure 18:
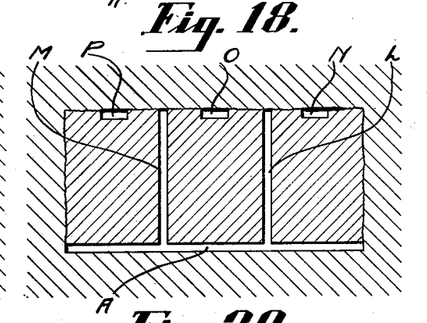
Figure 19:
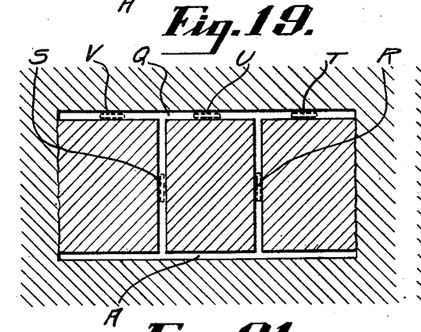
Figure 20:
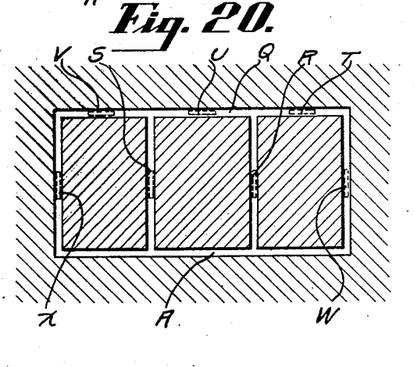
Figure 21:
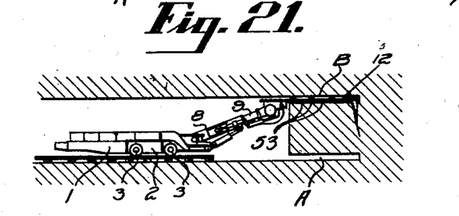
Fig. 21 is a diagrammatic view showing the mining apparatus in a mine with the cutter bar in coal breaking position.

The general mode of operation of the improved coal cutting and dislodging apparatus is as follows: The apparatus may be propelled along the mine trackway at either a relatively high transport speed or a relatively low speed suitable for cutting, in a manner clearly described in the above mentioned copending application, and when the working place is reached, with the apparatus in the position shown diagrammatically in Fig. 21, the turntable 5, arm structure 8, revolving head 9 and cutter support 11 may be adjusted to move the kerf cutter 12 in any desired location with respect to the working face and either rib. When the kerf cutter is suitably positioned it may be sumped in, swung arcuately in its plane and withdrawn from the coal, in a well known manner to form a plane kerf in the coal. In Figs. 15 to 21, a horizontal plane kerf at the level of the mine floor is indicated at A. When the cut in the coal is completed, the arm structure and cutter support may be swung to position the kerf cutter near the roof level and thereafter the kerf cutter may be sumped in an endwise direction into the coal as indicated at B in Figs. 15 and 21. The hydraulic pump of the hydraulic fluid system may then be operated to supply fluid under pressure, under the control of the valve 132, to the kerf cutter to act on the hydraulic plungers 53 carried by the kerf cutter to apply a powerful coal breaking force, substantially along the length of the cutting portion of the kerf cutter and in planes perpendicular to the plane of the kerf cutter, to the coal above the horizontal kerf A to dislodge the coal from the coal seam. To complete the breaking down of the coal, the kerf cutter may thereafter be inserted in an endwise direction into the coal successively into the positions indicated at C and D in Fig. 15 and a coal breaking pressure applied to the coal, when the kerf cutter is so positioned, to break down completely the undercut coal from the coal face. In Fig. 16 a vertical kerf E is cut in the coal face midway between the ribs in planes perpendicular to the horizontal kerf A. The kerf cutter is then sumped in an endwise direction into the coal to the position indicated at F in Fig. 16, and a coal breaking pressure applied to the coal to break down the latter between the right hand rib and the vertical kerf E. Thereafter the kerf cutter is positioned at G in Fig. 16 to break down the coal between the left hand rib and the vertical kerf E. In Fig. 17, parallel vertical kerfs H and I are cut at the ribs perpendicular to the horizontal kerf A, and the kerf cutter is inserted in positions J and K to break down the coal between the vertical kerfs. In Fig. 18 parallel vertical kerfs L and M are cut in the coal face in spaced relation between the ribs, and the kerf cutter is thereafter moved successively into the positions N, O and P to break down the coal between the ribs and between the vertical kerfs. In Fig. 19 a horizontal kerf is cut at Q at the roof level and the parallel horizontal kerfs A and Q are intersected by parallel vertical kerfs R and S and thereafter the kerf cutter is moved successively to the positions indicated at T, U and V to break down the block of coal between the parallel vertical kerfs and the coal between the vertical kerfs and the ribs. In Fig. 20 the horizontal kerfs A and Q are cut at the floor and roof levels and the parallel kerfs R and S are inserted in the coal face in planes perpendicular to the parallel horizontal kerfs, and in addition, vertical kerfs W and X are cut at the ribs, thereby to divide the coal face into blocks. The kerf cutter, as shown in Fig. 19, is then moved into the kerf Q successively to the positions indicated at T, U and V to break down the blocks of coal. It will be evident that in Figs. 18, 19 and 20 the kerf cutter may be inserted in the vertical kerfs to apply a lateral breaking pressure to the coal and that by the provision of the adjustable supporting structure for the kerf cutter a coal breaking pressure may be applied to the coal at any desired location in the coal face and in either rib. It will further be evident that during any of the kerf cutting operations above described, the expansible breaking means embodied in the kerf cutter may be operated to guide the kerf cutter during the cutting operation, thereby to prevent binding of the kerf cutter in the kerf, and further, the expansible breaking means may be utilized to free a stuck kerf cutter.

As a result of this invention, it will be noted that an improved coal mining apparatus of the combined cutting and dislodging type is provided whereby the coal in the coal seam may be quickly and expeditiously cut and dislodged, thereby reducing the time consumed in the preparation of the coal for the loading machine. It will also be noted that by embodying the improved expansible hydraulic breaker means in the cutter bar of a coal cutting apparatus of the type disclosed, it is possible to utilize the hydraulic fluid system of the apparatus as a source of power for the coal breaking means, and as a result the apparatus is greatly simplified. It will further be evident that by embodying the coal breaker means in the cutter bar it is possible to apply a relatively powerful breaking force to the coal substantially along the entire length of the cutting portion of the cutter bar, and further, the breaker means may be inserted within openings in the coal formed by the cutter bar, thereby eliminating the necessity of separate hole forming devices. Other uses and advantages of the improved coal cutting and dislodging apparatus will be clearly apparent to those skilled in the art.

While there are in this application specifically described one form and several modifications which the invention may assume in practice, it will be understood that this form and these modifications are shown for purposes of illustration and that the invention may be further modified in various other forms without departing from its spirit or the scope of the appended claims.

What I claim as new and desire to secure by Letters Patent is:

1. In an apparatus of the character described, the combination with an elongated narrow kerf cutter carrying cutting elements for cutting a plane kerf in a coal seam, of hydraulically operated coal breaking means embodied in said kerf cutter including an expansible breaker element extending lengthwise of the central portion of the kerf cutter substantially along the length of the cutting portion of the kerf cutter, and means for supplying hydraulic pressure to said expansible breaker element to expand the latter to exert a coal breaking pressure in a direction perpendicular to the plane of the kerf.

2. In an apparatus of the character described, the combination with an elongated narrow kerf cutter carrying cutting elements for cutting a plane kerf in a coal seam, of hydraulically operated coal breaking means embodied in said kerf cutter including an expansible breaker element extending lengthwise centrally of the kerf cutter substantially along the length of the cutting portion of the kerf cutter, a plunger guided on said kerf cutter and actuated by said expansible element, and means for supplying hydraulic pressure to said expansible element to expand the latter to effect movement of said plunger in a direction transversely of the kerf cutter for exerting a coal breaking pressure in a direction perpendicular to the plane of the kerf.

3. In an apparatus of the character described, an elongated plane cutter bar having an endless cutter chain guided about its margin, and coal breaking means embodied in said cutter bar comprising an elongated hydraulic expansible breaker pad extending centrally of the cutter bar substantially along the length of the cutting portion of the latter, and means for supplying hydraulic pressure to said breaker pad.

4. In combination, a kerf cutter having cutting elements for cutting a plane kerf in a coal seam, and expansible breaker means embodied in the kerf cutter including an expansible breaker member of narrow elongated form extending longitudinally of the kerf cutter throughout a substantial portion of the length of the latter, for exerting a powerful coal breaking pressure on the coal to break down the latter from the coal seam.

CHARLES F. OSGOOD.